July 22, 1969      S. V. DILLON      3,456,963
BEAD TYPE COUPLING FOR PLAIN END PIPE JOINT
Filed July 31, 1967      3 Sheets-Sheet 1
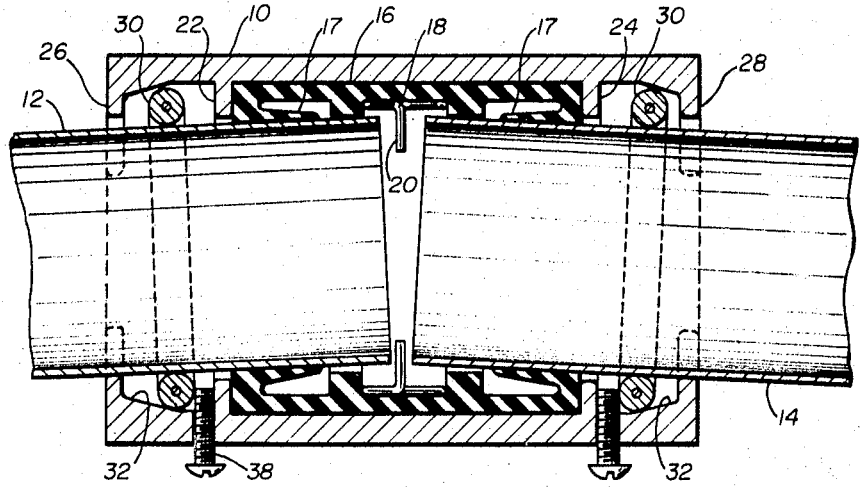
Fig. 1.
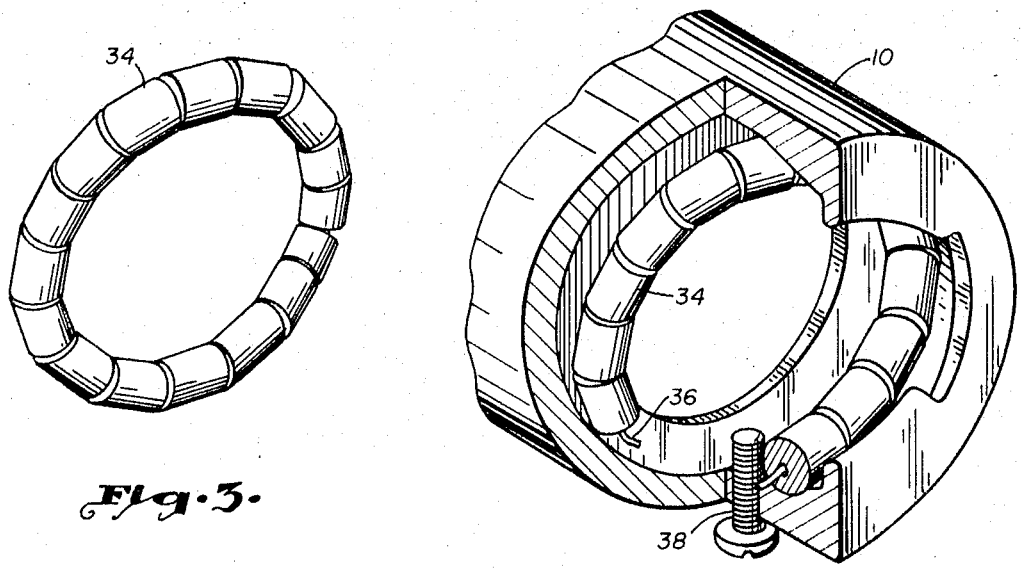
Fig. 3.
Fig. 2.
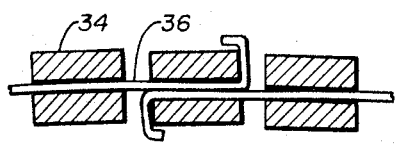
Fig. 4.
INVENTOR.
STEPHEN V. DILLON
BY *Head & Johnson*
ATTORNEYS

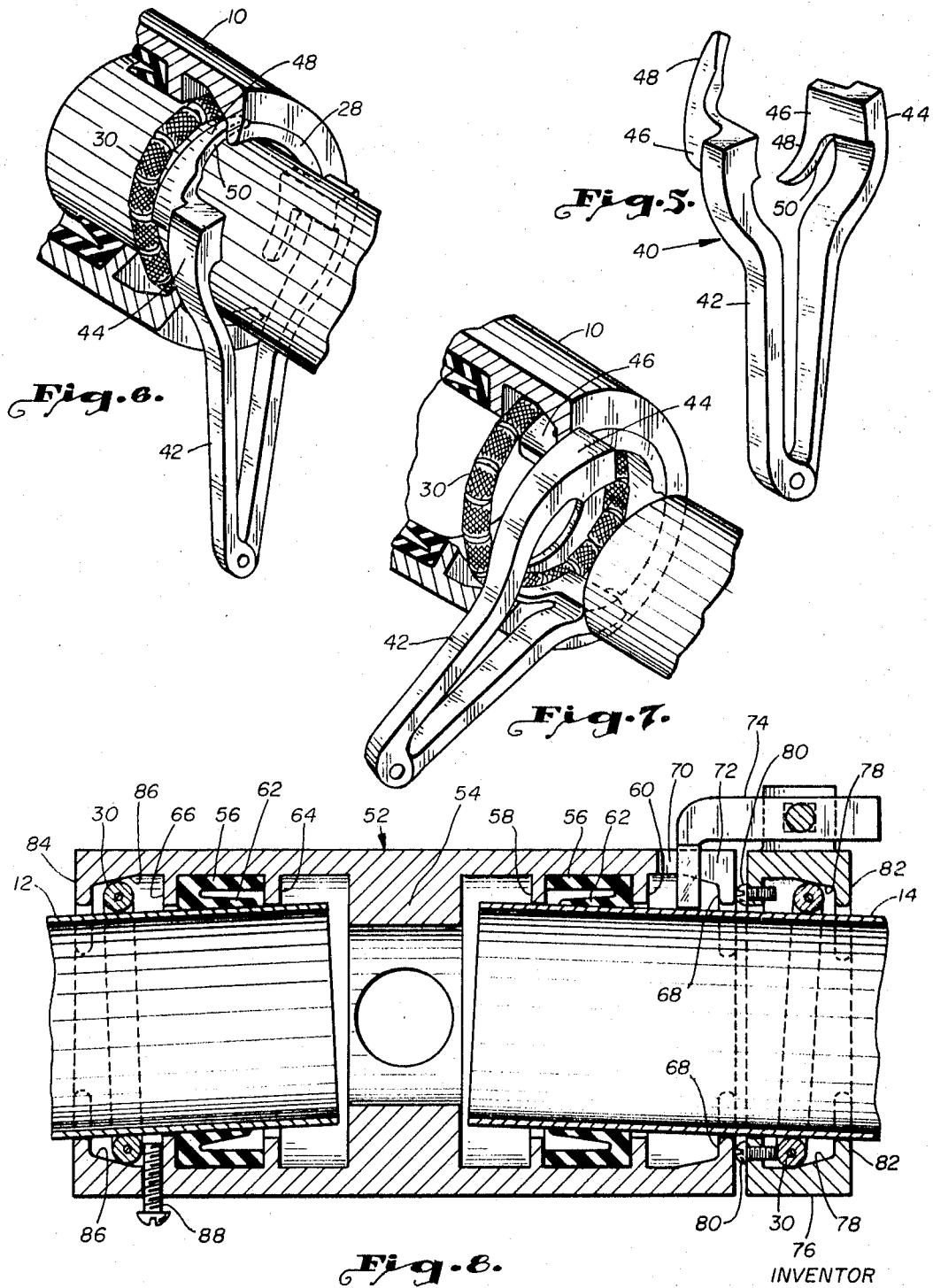

United States Patent Office 3,456,963
Patented July 22, 1969

3,456,963
BEAD TYPE COUPLING FOR PLAIN
END PIPE JOINT
Stephen V. Dillon, 2256 S. Troost,
Tulsa, Okla. 74114
Filed July 31, 1967, Ser. No. 657,254
Int. Cl. F16l 17/00, 33/16
U.S. Cl. 285—39                 1 Claim

ABSTRACT OF THE DISCLOSURE

The quick connect and disconnect coupling has an interior peripheral flexible seal member through which the pipe joint is inserted and an interior bead type retaining member through which the type is inserted. A seal member is held in position axially by integral peripheral lips in the housing. The retention collar moves freely on a tapered surface between one of the peripheral lips and a stop bug adjacent the end of the housing. As a plain end pipe joint is inserted into the housing it moves freely through the stop collar and seal member on insertion but an attempt to remove the tubing causes the stop collar to become wedged between the exterior of the pipe joint and the reduced diameter of the tapered surface. A second embodiment is described in which the stop collar and tapered surface are on a separate housing. The pipe joint is inserted first through the separate housing and then into the main housing with the separate housing to be locked in place adjacent with the main housing.

CROSS-REFERENCE

This application is a further improvement of the pipe coupling disclosed in Ser. No. 526,803, filed Feb. 11, 1966, by the same inventor and now Pat. No. 3,411,815.

BACKGROUND OF THE INVENTION

This invention relates to a pipe coupling and has for its object the provision of a quick-action coupling for retaining adjacent abutting ends of plain pipe, tubing, hose connections or rod members and for further providing means for quickly releasing the adjoining pipe sections.

It is desirous in many fluid flow systems to provide means for making a quick connection between abutting ends of pipe or tubing. A typical example is in the irrigation art where it is desirable to move, relocate and recombine tubing at desired times and positions without undue interruption or making and breaking coupling between the pipe, tubing or rods. Other examples include the connections with valves and the meterings of fluids in other domestic and industrial uses.

Accordingly, this invention relates to and provides a quick action coupling member which can best be understood by reference to the following specification and claims when taken in conjunction with the following illustration of which:

FIGURE 1 is a sectional view of the pipe coupling of this invention.

FIGURE 2 is a fragmentary perspective view, partly in section of the pipe coupling of FIGURE 1.

FIGURE 3 is a perspective view of a pipe holding member of the pipe coupling of this invention.

FIGURE 4 is a fragmentary sectional view of the pipe holding member of FIGURE 3.

FIGURE 5 is a perspective view of a pipe removal member according to this invention.

FIGURE 6 is a fragmentary perspective view, partly in section, of the pipe coupling of this invention, showing one position of the pipe removal member in the pipe coupling.

FIGURE 7 is a fragmentary perspective view, partly in cross-section, similar to FIGURE 6, showing a second position of the pipe removal member.

FIGURE 8 is a sectional view of an alternate embodiment of a pipe coupling according to this invention.

DESCRIPTION OF THE PREFERRED EMBODIMENTS

Figure 9:
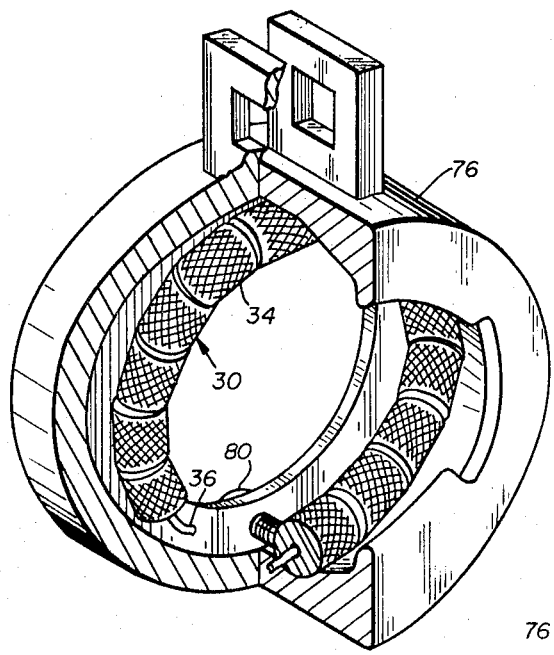
FIGURE 9 is a perspective view, partly in section, of one component of the pipe coupling of FIGURE 8 showing the position of the pipe collar member.

The pipe coupling of this invention comprises a cylindrical housing into which adjacent joints of pipe may be inserted. A sealing member is provided within the coupling to provide a sealing surface between the pipe and the coupling. The sealing member is held in position between protrusions within the coupling, and the sealing member has a normally inwardly tapering surface which biases against the exterior surface of the pipe. The pipe is held in position by the operation of a holding member which encircles the pipe and which moves on the tapered surface between the aforementioned inward protrusions and a series of lugs adjacent the end of a coupling. Thus, an attempt to move the pipe, to remove the pipe, wedges the holding member between the pipe and the tapered surface. A cooperating device is described which may be inserted between the surface of the pipe and the lug members so that the pipe joint may be easily removed. The alternate embodiment positions the holding member on a second housing which can be quickly latched and unlatched against the main housing.

Referring now to the drawings in detail, the pipe coupling of this invention includes a cylindrical housing 10 which has an axial opening therethrough to receive adjacent ends of pipe joints 12 and 14, respectively. Interiorly of the housing is a resilient seal member 16 having tapered portions 17 of a material such as rubber and which includes a pipe stop 18 to prevent the pipe section from moving axially within the housing more than a chosen distance. Pipe stop 18 includes a transverse projection 20 against which the ends of the pipe joints may abut upon insertion. Projection 20 may be in the form of a flat disc or of a finger-like projection from the pipe stop. Seal member 16 is positioned between lip rings 22 and 24 and preferably fits closely between these axially spaced rings. Rings 22 and 24 not only maintain the seal member in a stable position within the housing, but also contact a sufficient portion of the end wall of the seal member to support and strengthen the end portion of the seal member. Of course, lip rings 22 and 24 are of sufficient diameter to permit the pipe joint to fit easily therethrough. Adjacent each end of the housing 10 and axially spaced from lip rings 22 and 24 are respective stop lugs 26 and 28 which are shoulders projecting towards the axis of the housing 10 and are positioned to cooperate with a pipe removal member to be described later. Stop lugs 26 at one end of the cylindrical housing or at least two in number, and likewise are stop lugs 28 at the other end of the housing. Stop lugs 26 and 28 also act as a stop for pipe holding member 30 of which one is positioned between lip ring 22 and stop lug 26 and the other is positioned between lip ring 24 and stop lug 28. Pipe holding member 30 moves freely along a tapered peripheral surface 32 of housing 10 between the lip rings 22 and 24 and the stop lugs 26 and 28. Pipe holding member 30 is more clearly shown in FIGURES 2, 3 and 4, and is seen to consist of a number of rollers or bearing members 34 loosely mounted through their longitudinal axis on a loop of wire or similar material 36 to form a ring-like structure. FIGURE 4 shows one manner in which the roller members may be wound on the loop. As shown in FIGURE 1, holding member 30 has an internal diameter slightly larger than the pipe joint which it is intended to hold in place, and an exterior diameter slightly smaller than the interior diameter of housing 10, but with an exterior diameter slightly larger than the outermost end of tapered surface 32. Housing 10 may also include an adjustable stop member 38 such as a machine bolt or a screw, which is insertable through the exterior of the housing at a point between the lip ring and the stop lug in a manner that holding member 30 will be between stop member 38 and the stop lugs.

In operation, pipe joints 12 and 14 are inserted into opposite ends of housing 10 and are held sealingly within seal member 16 by the contacting of tapered surface 17 with the outer surface of the pipe joints. The housing 10 may or may not include pipe stop 18, since in some operations the abutment of the ends of pipe joint will determine the limit of intrusion. The pipe joints are inserted through holding members 30 and, as long as the force is directed inwardly from the end of the housing 10, holding member 30 will be moved toward the surface of larger diameter tapered surface 32. But, when an attempt is made to remove the pipe joint, holding member 30 is moved slightly toward an area of reduced diameter along surface 32 and a number of rollers 34 are wedged tightly between the outer surface of the pipe joint and tapered surface 32. Stop member 38 may be adjusted if necessary to act as a limiting member for one or more arcuate portions of holding member 30, since holding member 30 is intended to have a small degree of flexibility.

To remove the pipe joints quickly and easily, the removal member shown in FIGURE 5 is inserted in the arcuate openings between the stop lugs at each end of the housing and the outer surface of the pipe joint. The manner in which this is done is described in FIGURES 6 and 7. The removal member 40 includes a pair of elongated hinged leg portions 42. At the free end of each leg 42 is formed a curved portion 44 which corresponds to the curvature of the outer portion of the pipe joint with which the removal member is to be employed. Extending longitudinally from the curved surface 44 of the leg member is an extension 46 of the curved portion 44. Extension 46 has an interior surface on the same radius of the interior curved portion 44, and extension 46 provides a body for a curved hook portion 48 which also has an interior surface of the same radius as the interior surfaces of extension 46 and curved portion 44. Hook 48 has a tapered edge 50 which is used to cause the wedging force necessary to loosen the holding member when the pipe joint is to be removed. This operation is disclosed in FIGURES 6 and 7. In FIGURE 6 the removal member is inserted inside the housing 10 in a manner that the extension portion 46 and hook 48 fit between the stop lugs 26 and are in a position to abut holding member 30. Then, as shown in FIGURE 7, a twist is given to the pipe removal member 40 and the tapered portion 50 of the hook 48 is inserted between the rear surface of lug 26 and holding member 30, and by this wedging action, moves holding member 30 to a position of greater interior diameter along tapered surface 32. With holding removal member 42 then held in this position, the pipe joint is quickly and easily removed.

Figure 10:
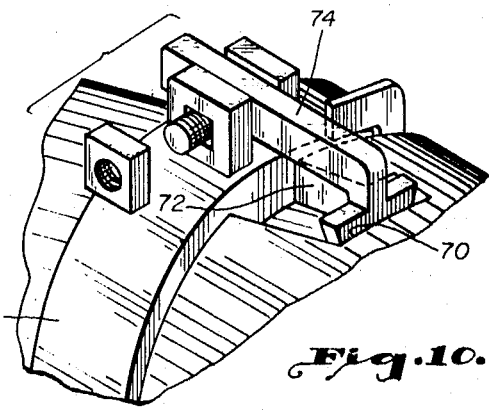
FIGURE 10 is a fragmentary perspective view of a portion of the pipe coupling of FIGURE 8 showing one position of a locking member of the pipe coupling.
Figure 11:
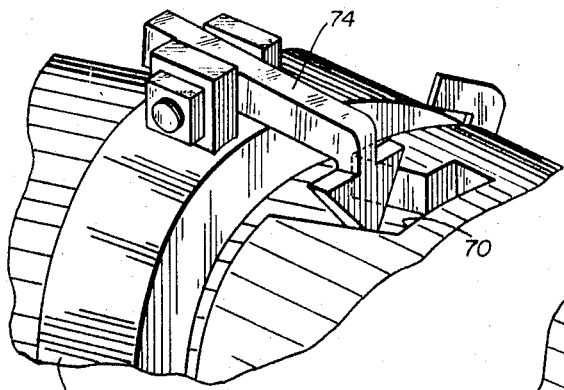
FIGURE 11 is a perspective view similar to FIGURE 10 showing a second position of a locking member of FIGURE 10.
Figure 12:
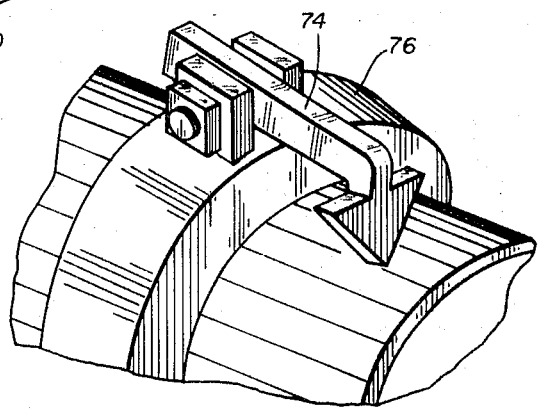
FIGURE 12 is a perspective view similar to FIGURE 11 showing the position of locking member removed from the other pipe coupling component.

In FIGURES 8 through 12 an alternate embodiment of the invention is described. Referring now to FIGURE 8, the pipe coupling includes the cylindrical housing 52 which has an axial opening therein to permit entrance of pipe joints 12 and 14. Cylindrical housing 52 may include a wall portion of reduced interior diameter which acts as a pipe stop or limiting member 54 arranged axially within housing 52 is a seal member 56 positioned between two lip rings 58 and 60 which act to position seal member 56 and also to strengthen the side walls of seal 56. Seal member 56 also has an inwardly tapering lip portion 62 which, being of flexible material, is made to be of slightly smaller diameter than the pipe joint so that a pipe seal is made around the pipe joint. At the other end of the housing, the sealing member 56 may be held in position by similar lip rings 64 and 66. Axially spaced from lip rings 60 adjacent one end of housing 52 are lug stops 68 which serve as a guide and support for the pipe joint and provide a surface against which a second coupling abuts. This end of the housing adjacent stop lugs 68 includes a locking slot 70, more clearly shown in FIGURES 10 and 11, which communicates with a passageway 72 to provide a means for receiving a latch member 74 secured to a second housing 76. As shown in FIGURE 8, housing 76 is positioned about pipe joint 14 and locked into position against housing 52. Thus, to release housing 76, housing 76 is rotated slightly in locking slot 70 until it is opposite passageway 72 and then latch 74 is withdrawn through passageway 72. Also as shown in FIGURE 8, a pipe holding member is positioned within housing 76 in contradistinction to the arrangement to FIGURE 1. A holding member 30 is positioned in housing 76 in contact with a tapered surface 78. Stop members 80 are provided in housing 76 to adjustably position and limit the movement of holding member 30. These may be conventional machine bolts or allen head set screws. Again as in operation of FIGURE 1, with a pipe joint inserted into housing 76 and housing 52, the movement of the pipe joint into the housing is easily accomplished, but an attempt to remove the pipe joint will cause holding member 30 to become tightly wedged between tapered surface 78 and the outer surface of pipe joint 14. Cylindrical housing 76 may be removed from its locked position against housing 52 with holding member 30 retaining pipe joint 14 securely, or holding member 34 may be moved to a loosened position within housing 76 so that pipe joint 14 may be removed therefrom with housing 76 still locked to housing 52 by operation of removal member 40 as described above. That is, housing 76 includes stop lugs 82 which are similar to stop lugs 26 and 28 in FIGURE 1. Then, removal member 40 is inserted between stop lugs 82 and pipe joint 14 and operated in the same manner as described for FIGURE 1.

FIGURE 8 further describes a pipe coupling having a second cylindrical housing latched to one end as just described and an alternate form of sealing and holding member at the other end as will be described hereinafter, but it is to be understood that the pipe coupling may include a second cylindrical member 76 at both ends or in the alternative may include at each end the type of sealing arrangement now to be described. At the other end of housing 52 a series of stop lugs 84 are provided adjacent that end and a tapered interior peripheral surface 86 is provided between lip ring 66 and stop lugs 84. Positioned between lip ring 66 and stop lug 84 is a holding member 30 as hereinbefore described. A stop member 88, which may be a conventional machine bolt or allen head set screw, enters the interior of housing 52 near one end of tapered surface 86 to act as an adjustable stop or limit for the movement of holding member 30. In operation, a pipe joint of proper size may be easily inserted into this end of housing 52 to be contacted sealingly by lip portion 62 and held in position against removal by wedging of holding member 30 between tapered surface 86 and the exterior surface of pipe joint 12.

The wedging action of holding member 30 between the pipe section and the tapered surface of the housing is most effective when the conical section formed by tapered surface 32 in FIGURE 1 or tapered surfaces 78 and 86 in FIGURE 8 are at an angle of not less than 1° nor more than 10° with respect to the longitudinal axis of housing 10.

Since many different embodiments of this invention may be made without departing from the spirit and scope thereof, it is to be understood that the specific embodiments described in detail herein are not to be taken in a limiting sense.

I claim:
1. A pipe coupling comprising:
   a cylindrical housing having an axial opening therethrough to receive adjacent joints of pipe, said housing including axially spaced lip rings therein, a stop lug adjacent each end, said lug comprising a plurality of radial segments having spaces therebetween to receive a pipe removal number, and a tapered interior peripheral surface between each of said lip rings and said stop lugs,
   a seal member between said lip rings having an axial opening therethrough and with an inwardly tapering interior peripheral surface adjacent each end to sealingly receive said pipe joint therein,
   a pipe holding member positioned between said lip ring and said stop lug, said pipe holding member comprising a substantially closed annular ring having a plurality of cylindrical rollers juxtaposed thereon, said pipe holding member positionable about the exterior periphery of said pipe joint to hold said pipe joint in place, and
   a stop member positioned within said housing adjacent each pipe holding member to retain said pipe holding member in a limiting position adjacent said stop member.

References Cited

UNITED STATES PATENTS

| | | | |
|---|---|---|---|
| 2,017,994 | 10/1935 | Spang | 285—111 X |
| 2,225,610 | 12/1940 | Christian | 285—321 X |
| 2,283,975 | 5/1942 | Dillon | 285—104 |
| 2,449,795 | 9/1948 | Stillwagon | 285—112 X |
| 2,677,558 | 5/1954 | Cornelius | 285—6 |

FOREIGN PATENTS

| | | |
|---|---|---|
| 240,151 | 8/1962 | Australia. |
| 605,006 | 7/1948 | Great Britain. |
| 6,401,728 | 8/1965 | Netherlands. |

THOMAS F. CALLAGHAN, Primary Examiner

U.S. Cl. X.R.

285—6, 112, 321